United States Patent
Holmes et al.

(10) Patent No.: US 6,751,475 B1
(45) Date of Patent: Jun. 15, 2004

(54) SHARED-REVENUE BILLING SYSTEM FOR TRANSMISSION OF WIRELESS DATA FROM A VEHICLE

(75) Inventors: David William Holmes, Redmond, WA (US); Hitesh Shah, Seattle, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 615 days.

(21) Appl. No.: 09/691,798

(22) Filed: Oct. 19, 2000

(51) Int. Cl.[7] ............................. H04M 11/00; H04B 1/38
(52) U.S. Cl. .................... 455/557; 455/406; 455/569.1; 455/414.1
(58) Field of Search ................................ 455/403, 405, 455/406–408, 414.1, 414.2, 415, 420, 41.1, 41.2, 556.1, 568.1, 568.7, 569, 569.1, 99, 557; 379/115.01, 115.03, 121.03, 127.01–127.04

(56) References Cited

U.S. PATENT DOCUMENTS

| | | | |
|---|---|---|---|
| 5,233,642 A | * 8/1993 | Renton | 455/405 |
| 5,251,248 A | * 10/1993 | Tokunaga et al. | 379/114.27 |
| 5,396,417 A | 3/1995 | Burks et al. | |
| 5,548,822 A | 8/1996 | Yogo | |
| 5,706,330 A | 1/1998 | Bufferd et al. | |
| 5,717,374 A | 2/1998 | Smith | |
| 5,784,443 A | 7/1998 | Chapman et al. | |
| 5,787,359 A | 7/1998 | Nagata | |
| 5,797,134 A | 8/1998 | McMillan et al. | |
| 5,828,738 A | 10/1998 | Spaeth | |
| 5,835,580 A | * 11/1998 | Fraser | 379/115.01 |
| 5,875,412 A | 2/1999 | Sulich et al. | |
| 5,893,903 A | 4/1999 | Eisdorfer et al. | |
| 5,918,175 A | 6/1999 | Tayloe et al. | |
| 5,956,639 A | 9/1999 | Armbruster et al. | |
| 5,982,754 A | 11/1999 | Itou et al. | |
| 6,144,336 A | * 11/2000 | Preston et al. | 342/357.09 |
| 6,169,890 B1 | * 1/2001 | Vatanen | 455/406 |
| 6,198,920 B1 | * 3/2001 | Doviak et al. | 455/426.1 |
| 6,226,497 B1 | 5/2001 | Güntzer et al. | |
| 6,249,740 B1 | 6/2001 | Ito et al. | |
| 6,282,491 B1 | 8/2001 | Bochmann et al. | |
| 6,298,306 B1 | 10/2001 | Suarez et al. | |
| 6,377,825 B1 | 4/2002 | Kennedy et al. | |
| 6,434,458 B1 | 8/2002 | Laguer-Diaz et al. | |
| 6,535,743 B1 | * 3/2003 | Kennedy et al. | 455/456.1 |
| 2003/0109244 A1 | * 6/2003 | Tendler | 455/345 |

FOREIGN PATENT DOCUMENTS

| | | |
|---|---|---|
| EP | 1 014 339 A2 | 6/2000 |
| EP | 1 111 897 A2 | 6/2001 |
| JP | 2001-301576 A | 10/2001 |
| WO | WO 98/57824 A1 | 12/1998 |
| WO | WO 99/10844 A1 | 3/1999 |
| WO | WO 99/48062 A1 | 9/1999 |

OTHER PUBLICATIONS

Unknown Author; "Motorola Partners with Ford and Westinghouse in First–ever Emergency Messaging System to Hit Automotive Market;" Mar. 1996; 3 pgs; Chicago, IL; www.motorola.com.

(List continued on next page.)

Primary Examiner—Nay Maung
Assistant Examiner—Edan Orgad
(74) Attorney, Agent, or Firm—Perkins Coie LLP

(57) ABSTRACT

Methods and systems monitor a period of time associated with using a wireless device when the wireless device is integrated with a vehicle. The methods and systems can include a wireless network that communicates with the wireless device. The methods and systems can further include a computer server communicating with the wireless network that monitors a period of time associated with the wireless device while the wireless device is integrated with the vehicle. Revenue associated with the time period may be used to determine a revenue split between a wireless service provider and at least one other party.

47 Claims, 5 Drawing Sheets

OTHER PUBLICATIONS

Yang, Dori Jones; "Driving and Dialing for Dummies?" U.S. News & World Report; Jan. 8, 2001; vol. 130 Issue 1, p. 32, 2/3 p,. 1c.

Gilroy, Amy; "Bluetooth Gears Up for the Car," TWICE: This Week in Consumer Electronics; Nov. 5, 2001, vol. 16 Issue 25, p24, 2p.

Harbord, J; "*Unique Air (cellular radio)*;" Database Inspec Online! The Institute of Electrical Engineers, Stevenage, GB; Dec. 1985; pp. 28–29; Database accession No. 2620386 XP002223287 abstract; & What Telephone and Communications News No. 16; U.K.

TIA/EIA Interim Standard "Electrical Specification for the Portable Phone to Vehicle Interface" Apr. 2000.

* cited by examiner

SHARED-REVENUE BILLING SYSTEM FOR TRANSMISSION OF WIRELESS DATA FROM A VEHICLE

This application is related to application Ser. No. 09/691,800, entitled "A Method of Sharing Revenue for Transmission of Wireless Data from a Vehicle," assigned to the assignee of the present application.

BACKGROUND OF THE INVENTION

1. Field of the Invention

The present invention relates to wireless telephone systems and more specifically to a system for sharing revenue associated with wireless phone use while the phone is attached to a vehicle in a hands-free mode.

2. Description of Related Art

As access to wireless phone technology advances, more people use their phones while driving. Some vehicle mounting systems are available for wireless phones, but many users hold their phones and talk while driving. This is often called "hands-on" or "hand-held" use of the wireless phone.

Add-on and manufacturer-installed mounting systems have been developed to enable convenient "hands-free" use of the wireless phones that allows the driver to maintain both hands on the wheel. The add-on or after-market mounting systems are expensive and not aesthetically pleasing. Such mounting systems must be installable in any kind of vehicle. Generally, only after-market mounting systems are available for mounting the phones because most automobile manufacturers do not provide the capability in new vehicles. Automobile manufacturers have a disincentive to design and include phone-mounting systems in vehicles because of the increased cost of the vehicle that consumers are unwilling to pay and lack of uniformity with the various models of wireless phones on the market.

SUMMARY OF THE INVENTION

The following invention addresses the above deficiencies. An object of the present invention is to allow the driver to maintain both hands on the wheel while using a wireless phone A further object of the present invention is to provide incentive for automobile manufacturers and service providers to include phone-mounting systems in their original equipment. A further object of the present invention is to monitor and record phone calls and data communication from a specific vehicle to enable the phone carrier to pay a percentage of the revenue to the vehicle manufacturer or other service provider for including a hands-free phone-mounting system.

According to an embodiment of the present invention, the invention comprises a system for monitoring data communication from a wireless device attached to a wireless device mounting unit using a vehicle identification number. A wireless device having a processor is mounted in the mounting unit in the vehicle and communicates with an electronic control unit within the vehicle via a proprietary or standard communication connection. In this manner, the wireless device becomes integrated with the vehicle electronic control unit.

For example, Bluetooth or TIA/TR45.1 standards (IS-788, IS-789) may be used for the Wireless device to communicate with the vehicle and receive the vehicle identification number. A wireless communication network communicates with the wireless device via a base station or base stations and an air interface. A program operating on the wireless device processor obtains and transmits to the wireless communication network the vehicle identification data. A computer server associated with the telecommunications network monitors and records all data communication made while the wireless device is integrated with the vehicle. When the wireless device is detached from the wireless device mounting unit within the vehicle, the wireless device transmits a signal to the network indicating that it is no longer integrated with the vehicle.

A computer server monitors and records the data transfer time while the wireless device is integrated with the wireless device mounting unit in the vehicle. The computer server calculates a percentage of the revenue gained from the period of time the wireless device is used while integrated with the vehicle. This percentage is paid to the manufacturer of the automobile or a service provider to compensate for the costs of design and construction of the hands-free wireless device mounting system.

Since the telecommunication network knows the vehicle from which calls are being made, and the vehicle identification is only obtained via a mounting unit, the above objectives are realized and deficiencies in the art addressed by the invention disclosed herein. The manufacturer or in-car service providers therefore have incentive to provide mounting systems for wireless devices or cellular phones because they will receive a percentage of revenue when a customer uses the wireless device when it is integrated in a hands-free mounting unit within a vehicle.

BRIEF DESCRIPTION OF THE DRAWINGS

The foregoing and other features of the invention are made more apparent in the ensuing Detailed Description of the Invention when read in conjunction with the attached drawings, wherein.

DETAILED DESCRIPTION OF THE INVENTION

Figure 1:
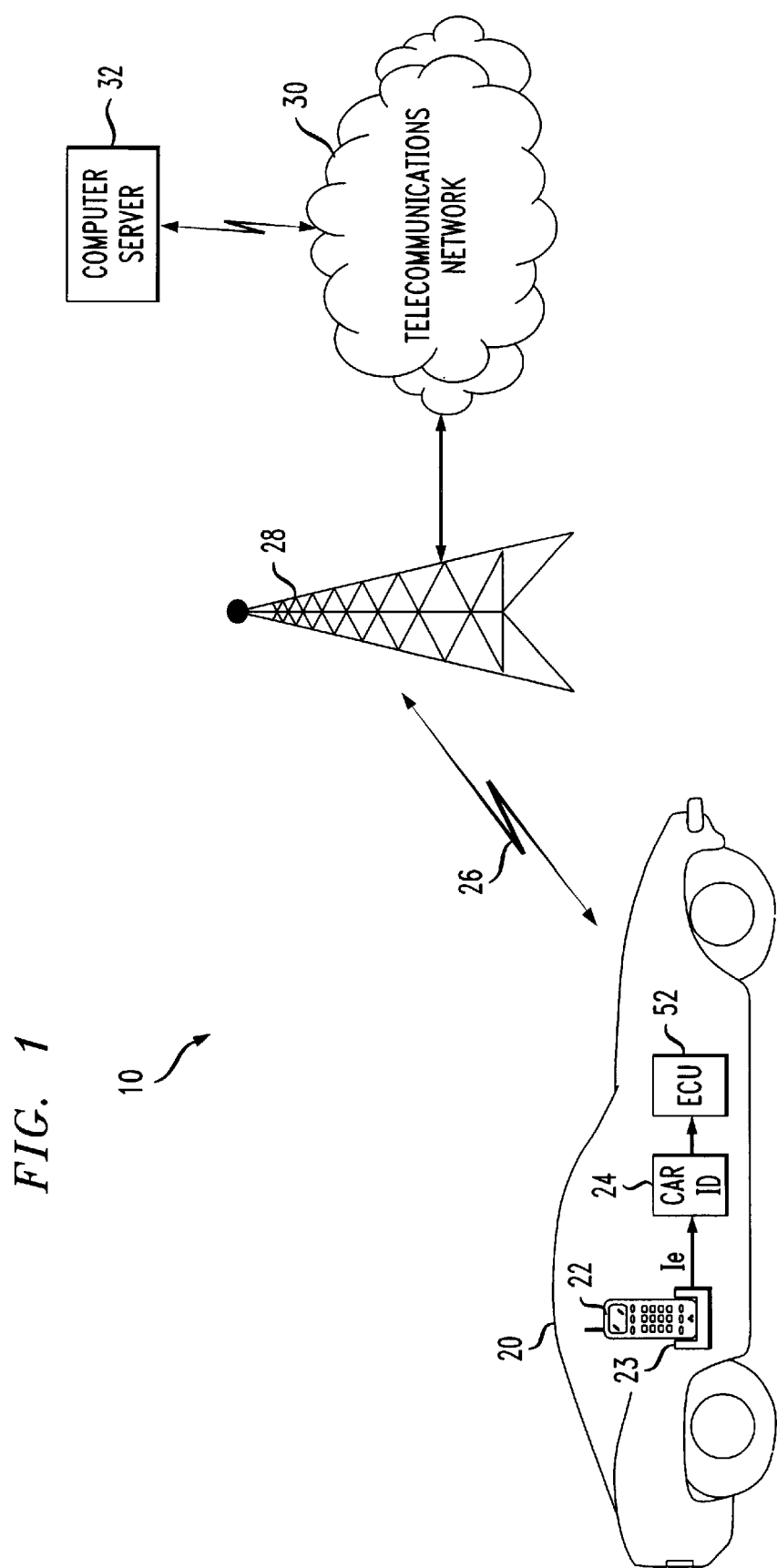
FIG. 1 illustrates the general system of an embodiment of the present invention.

An embodiment of the present invention is generally illustrated in FIG. 1. A wireless telecommunication system 10 comprises a wireless device 22, such as a mobile or cellular telephone, palm pilot, or the like, a base station 28 that communicates with the wireless device 22 via an air interface 26, and a wireless telecommunications network 30. The wireless device 22 may be any form of wireless device that is capable of communicating voice and/or data signals over an air interface. The network 30 may be connected to a public telephone network or other proprietary telephone network (not shown) for communicating telephone calls or data to and from the wireless device 22. The wireless network may be of any type, for example, a CDMA, TDMA, GSM, or other wireless network. The means and protocols for transferring voice and other data between the wireless device 22, base station 28 and communications network 30 are known to those of skill in the art.

A computer server 32 communicates with the network and receives information regarding data transfer time to the various wireless devices communicating with the network. The computer server 32 may also further handle billing of data transfer time for the wireless devices, among other possible responsibilities.

Wireless phones 22 may be mounted in vehicles 20 and used in a "hands-free" mode to enable the driver to maintain both hands on the steering wheel while using the phone. A mounting unit 23 enables the driver to attach the wireless device to the mounting unit 23 such that the driver is not required to use one hand to hold the phone. The mounting unit may be either an after-market purchase that is installed in a vehicle or may be built right into the vehicle as it is manufactured. The mounting unit 23 provides an interface between the wireless device 22 and the vehicle 20. In this manner, the wireless device 22 can receive and transmit information to and from the vehicle 20. This will be explained more fully in FIG. 2 later in this disclosure.

The term "mounting" herein may refer to any manner of integrating a wireless device 22 with the automobile control system or electronic control unit 52. For example, it is contemplated that any method or apparatus, whether it be wired or wireless, may be used for allowing a wireless device 22 to integrate, communicate and/or exchange data with a vehicle 20. Thus the mounting device 23 for integrating the wireless device 22 with the vehicle 20 may be near the steering wheel, in an arm-rest, above the driver, or at any location within the vehicle. Furthermore, the mounting device 23 may be arranged to allow the wireless device 22 to "mount" in a wireless manner to the mounting device 23. In other words, the communication between the wireless device 22 and the mounting device 23 may be accomplished over an air interface using radio signals or the like. In this scenario, no physical mounting arrangement is necessary.

The computer server 32 monitors the amount of time associated with data/voice communication from the wireless device 22 while the wireless device is mounted in the mounting unit 23. The period of time may be only for communication while the wireless device is mounted, or the period of time may be for the time the wireless device 22 is integrated with the mounting unit 23, regardless of whether data/voice communication takes place. A variety of parameters are contemplated for monitoring the period of time associated with the wireless device 22 being integrated with the vehicle wireless device mounting unit 23.

The vehicle through its electronic control unit (ECU) 52 transmits a vehicle identification number 24 to the wireless device 22 via the mounting system 23 and communication interface $I_e$ between the wireless device 22 and the vehicle 20. The wireless device 22 transmits the vehicle identification number 24 to the base station 28 and thus to the telecommunications network 30. This information informs the telecommunications network 30 and an associated computer server 32 of the vehicle to which the wireless device 22 is integrated. This vehicle identification number 24 is associated with all calls and data communication made from the vehicle 20. The vehicle identification number 24 may be numeric or alphanumeric and is designed to uniquely identify each vehicle. In this regard, it may be associated with the traditional vehicle identification number (VIN) for vehicles available electronically through one of the vehicle busses or through other means. The identification number may also be a proprietary number or a standard telecommunication number such as an ITU E.212 IMSI or E.164 ISDN address.

The amount of time that data communication takes place while the wireless device 22 is integrated with the mounting system 23 is monitored. This communication time may be monitored by the wireless device 22 or the computer server 32 or network 30. Preferably, the computer server 32 monitors and records this time for billing purposes.

Then, via the normal billing process known to those of skill in the art, the information regarding the amount of time the wireless device 22 is used from the vehicle 20 is added to the report or ticket describing the call. The monitoring of the calls to and from the vehicle may be accomplished in a packet mode. The packet mode is enabled, for example, by the teleservice capabilities of IS-136, CDPD, or the E-GPRS enhancement to IS-136 for third-generation data services. One of ordinary skill in the art will understand the modifications to base stations and networks to enable packet data communication.

A percentage of the billing costs associated with calls made from the vehicle 20 is paid to the vehicle manufacturer or to a service provider. This may be accomplished in any manner known to those of skill in the art, such as transfers to an account.

In addition to the vehicle manufacturer, other telematics service providers may need incentive to provide hands-free wireless phone capability. Any such service provider may also be able to participate in revenue-sharing according to the present invention. Accordingly, the revenue-sharing model is not based only on sharing with a vehicle manufacturer, but may be with any other party or service provider.

Figure 2:
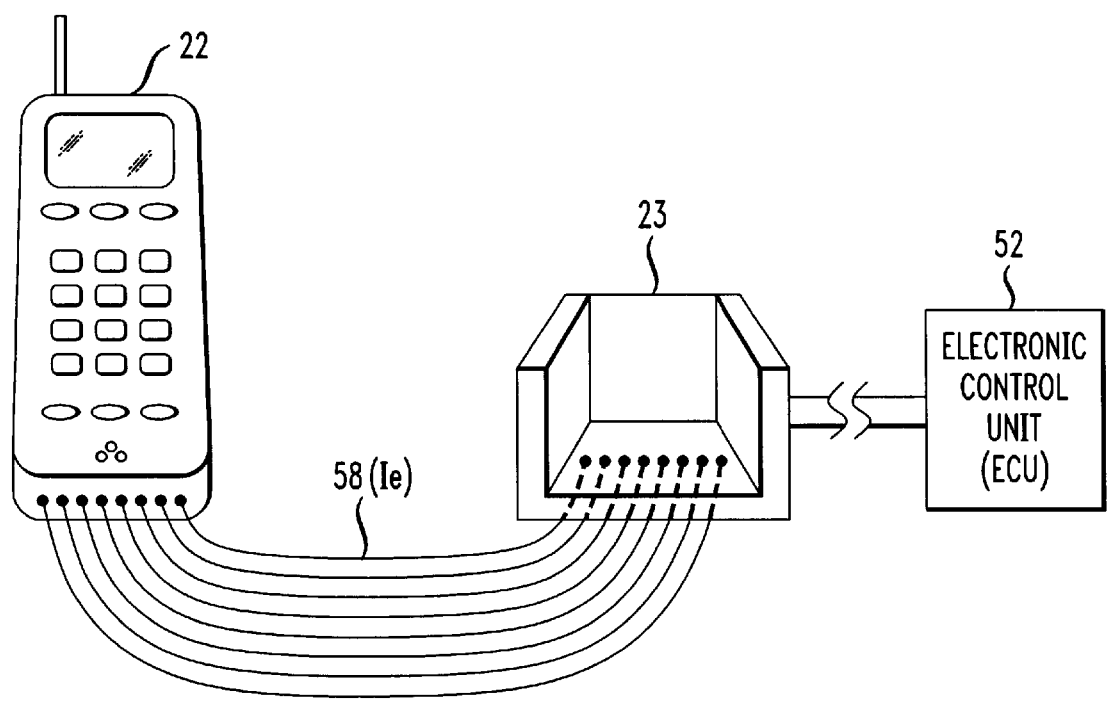
FIG. 2 shows an exemplary wireless device mounting unit.

FIG. 2 shows an exemplary mounting unit 23 and 8-pin interface 58 ($I_e$) for the wireless device 22 to be integrated with a vehicle. The mounting unit 23 communicates with the electronic control unit 52 and, in this example, uses 8 pins to receive and transmit information to and from the mounting unit 23 to the wireless device 22. Although the term electronic control unit 52 is used herein, any vehicle electronic control system that may communicate data such as the vehicle identification number is contemplated as within the scope of the present invention.

Figure 3:
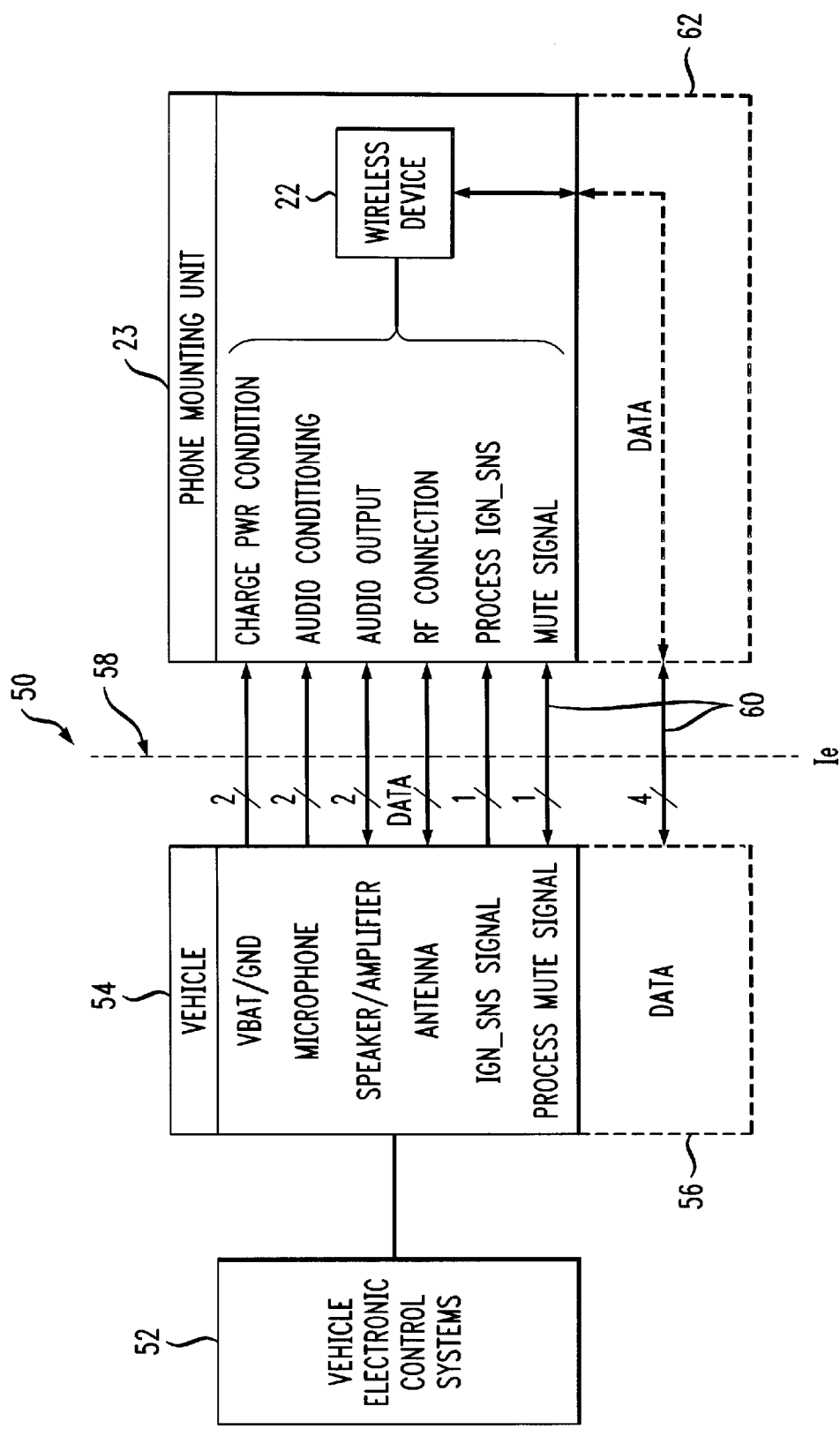
FIG. 3 illustrates the vehicle identification data communicated from the vehicle to the wireless device.

FIG. 3 illustrates the interface 58 ($I_e$) between the wireless device 22 and the vehicle 20. This illustration is based on the TIA/EIA/IS-789-A electrical specification for portable phone to vehicle interface. This is the Telecommunications Industry Association (TIA); Electronic Industries Alliance (EIA) Interim Standard (IS) that defines the specifications for the interface between the Automobile Adaptation System (AAS) and the Phone Adaptation System (PAS). This standard is provided for illustration only. It is understood and contemplated that other means for interfacing a wireless device with a vehicle system are included as within the scope of the invention.

In addition to a physical connection between a plurality of pins, the wireless device 22 may be mounted in a mounting unit 23 wherein the mounting unit 23 is primarily used to hold the device, rather than communicate data between the wireless device 22 and the vehicle 20. In this embodiment, the wireless device 22 would communicate via wireless means with the vehicle 20 to communicate and receive data from the vehicle 20. This could be accomplished through well-known means for communicating data via an air interface for short distances. Such systems, including the transmitter and receiver units, are well-known to those of ordinary skill in the art. For example, the "Bluetooth" specification may be used. In this manner, no standard pin arrangement would be necessary, and a specific mounting system may be unnecessary.

As illustrated in FIG. 3, the electronic control unit 52 communicates data to and from the mounting unit 23 connected to the wireless device 22 via the interface 58 (I$_e$) between the PAS and the AAS. The data includes, but is not limited to, a terminal voltage from the vehicle power supply (VBAT), microphone data, speaker/amplifier signals, antenna data, an ignition signal (IGN-SNS), a mute signal 54, and other data 56. As shown in FIG. 3, various pins 60 are provided to communicate the data to or from the vehicle to the wireless device 22. According to the TIA/EIA/IS-789-A standard, four pins are reserved for communication of data between the vehicle 20 and the wireless device 22. The vehicle data 56 and data 62 within the wireless device 22 may be communicated using these four pins 60. Preferably, these data pins are the means for communicating the vehicle ID 24 to the wireless device 22. Other means for communicating data may include, for example, a combination of wired connections such as described in IS-789 for functions such as powering the phone and antenna connections, with the Bluetooth, IrDA, or other wireless connectivity used for audio & general data (including the vehicle ID transmission to the phone).

To enable the wireless device 22 to receive the vehicle ID and transmit that ID to the wireless network 30, the wireless device 22 will include a data interface (which may or may not be integral with the Bluetooth, IrDA, or IS-789 adapter in or attached to the phone) and software. The software will receive and translate the vehicle ID into a form transmissible over the wireless network. Examples of such a translation of the vehicle ID number include SMS/CMT, IS-136-710, dedicated short messaging using facilities described in IS-136-6xx, GSM or IS-95/cdma-2000 SMS. In addition, an application operating over an IP transport will be needed, which may be browser based or use FTP.

Figure 4:
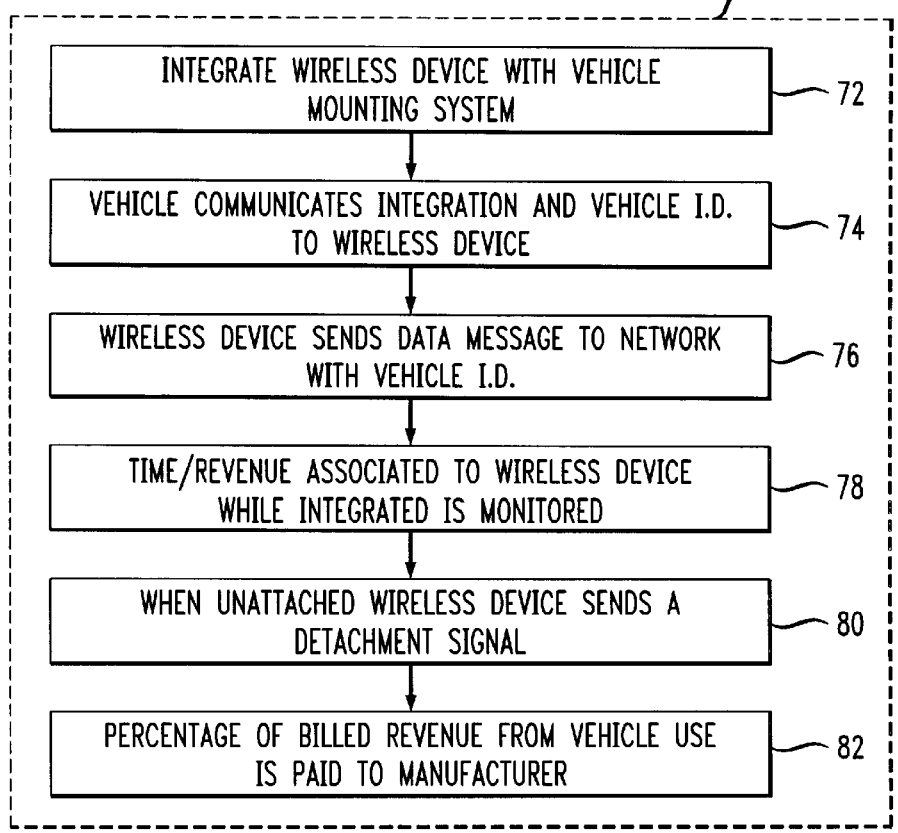
FIG. 4 shows an example flow chart of the process according to an embodiment of the invention.

According to another embodiment of the present invention, FIG. 4 illustrates an example process for communicating a vehicle identification number to the telecommunications network 30 for billing purposes. First, when the wireless device 22 is integrated (72) with the vehicle using a mounting unit 23, the vehicle communicates the successful attachment and transmits (74) the vehicle identification number to the wireless device. As discussed above, this can be accomplished through using the data pins 60 according to the proprietary or standard interface between the automobile and the wireless device 22. The wireless device 22 transmits a data message (76) using a short message tele-service, a voice-over-data, digital or analogue circuit-switched data service regarding the successful attachment to the vehicle and the vehicle identification number. As stated, there is no limit as to how the transmission of the data message occurs to the wireless telecommunications network, and many means known to those of ordinary skill in the art are available and will yet be available for transmitting data according to the present invention.

The details of how the information is communicated to the network is well known to those of skill in the art and examples of this process are provided in the IS-136-6xx and IS-136-710 standards. The SMS messages are transmitted as IS-41 SMS messages over the SS7 network to their destination, either directly to the billing records center if that is attached to the SS7 network, or, for example, via an SS7 network to an IP translation point if the billing center is IP-connected.

Once the network 30 verifies and acknowledges that the wireless device 22 is integrated with the vehicle 20, all calls or data communication occurring while the wireless device 22 is integrated with that vehicle 20 are monitored and recorded (78) on the computer server 32 or other network location. When the wireless device 22 detaches from the vehicle 20, a data message is sent (80) to the network indicating that the wireless device 22 is no longer integrated with the vehicle 20. This signal may be sent, as discussed above, as an SMS or other transmission but flagged as a detachment message. This may also be transmitted using a packet mode other than the SMS. The attachment and detachment signals may be provided only once for physical attachment or multiple times on a per-call basis.

In another aspect of this embodiment, a time-out period may be associated with the attachment signal. The time-out signal will last for a period of time after attachment. If no transmissions occur from the attached or integrated wireless device, a time-out device will stop any billing for calls or data communication until a transmission occurs while attached. Then, if any transmission occurs after a timeout period, a re-attach signal or transmission signal may-be provided to begin the billing procedure and monitoring. Thus, the network 30 stops associating calls from the wireless device 22 as being from the particular vehicle 20. Finally, a percentage of the revenue billed or received for the wireless calls made from the vehicle 20 are paid (82) to the manufacturer of that vehicle 20 or to the service provider.

In addition to the normal billing process, such as paying carriers for services supplied, another aspect of this embodiment of the invention provides for sending the attach/detach vehicle activity, location, and other information to the manufacturers or vehicle service providers for separate billing. This may be useful in the scenario of rental vehicles and the like.

In this manner, the vehicle manufacturers or service providers realize a revenue stream to compensate for the extra cost of designing and installing wireless device mounting systems in the vehicles.

Figure 5:
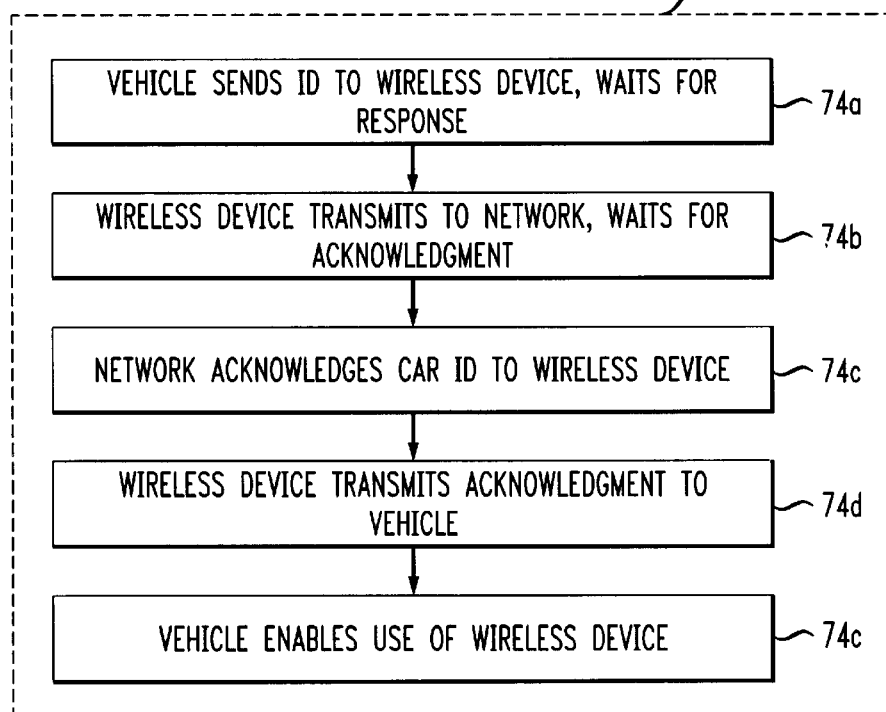
FIG. 5 illustrates another embodiment of the method of the present invention.

FIG. 5 further illustrates another embodiment of the present invention wherein step 74 of FIG. 4 is further expanded. In FIG. 5, step 74 of FIG. 4 further comprises a series of steps 74a–74e. The purpose of this further embodiment is to insure that the wireless device 22 will not be able to operate in the hands-free mounting system 23 unless the telecommunications network 30 acknowledges that the billing arrangement associated with that vehicle 20 is established. First, the vehicle 20 transmits the vehicle identification information to the wireless device 22 and waits for a response (74a). At this stage, the vehicle 20 prevents the wireless device 22 from operating until an acknowledgement is received from the network 30. The wireless device 22 communicates the vehicle identification to the network 30 and waits for acknowledgement (74b). The network 30, if appropriate, acknowledges the billing arrangement for that vehicle 20 by sending a data signal back to the wireless device (74c). The wireless device 22 transmits the acknowledgement to the vehicle (74d). Finally, the vehicle 20 enables the use of the wireless device 22 in the hands-free mode (74e).

While FIG. 5 illustrates the vehicle 20 in control of whether the wireless device 22 can operate in the hands-free mode, it is contemplated that this functionality may be accomplished via the network 30. For example, if the network 30 receives a data message from the wireless device 22 that it is integrated with a vehicle 20 having a vehicle identification number, the network 30 will not transmit or receive calls to or from that wireless device 22 unless the vehicle identification criteria is met. Other security means may be included to only enable the use of the wireless device 22 until the proper billing arrangement is verified. Any such means are contemplated as within the scope of this invention.

Figure 6:
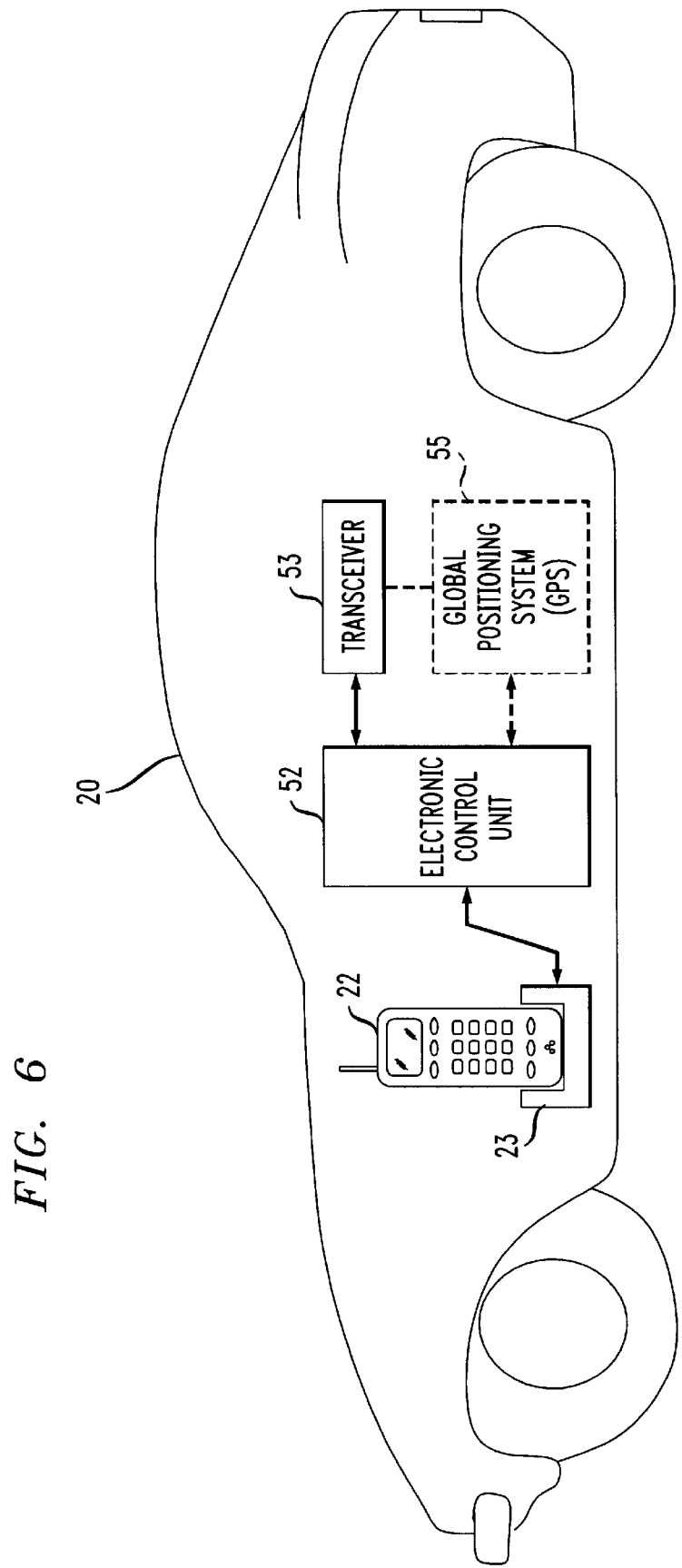
FIG. 6 illustrates an embodiment of the invention wherein a transmitter is built into the vehicle.

FIG. 6 illustrates another embodiment of the present invention in which a separate transceiver 53 is built into the vehicle 20. In this embodiment of the invention, a transmitter or transceiver 53 communicates with the computer server 52 within the vehicle 20. The transceiver receives signals from the wireless device 22 indicating when the wireless device 22 is attached via the mounting system 23 to the vehicle 20. The transceiver 53 may then transmit a signal to the billing center (not shown) via wireless means. The transmitter will send, with secure verification, the ID of the wireless device (which may be its MIN, IMSI, ESN, or other identification means), and the vehicle ID to the billing center.

A number of billing options may be provided. The billing options and revenue sharing program may depend on one or more factors, including whether the vehicle is on (ignition on), location (for example, rural or urban), velocity, weather conditions, etc. The data associated with this information may be provided, at least in part, by a global positioning system (GPS) system 55, illustrated in FIG. 6, that communicates with the electronic control unit 52 and transceiver 53. Other computer systems (not shown) may communicate weather conditions, traffic conditions, and other data that is coordinated with the location data from the GPS system 55 to arrive at billing arrangements.

Another aspect of the embodiment of the invention illustrated in FIG. 6 provides revenue incentives to the end user of the system. As an example, a revenue sharing arrangement may provide speed and geographic incentives for hands-free operation of the wireless device 22. In order to do this, the service provider monitors the use of the wireless device 22, as well as the speed of the vehicle 20 and location of the vehicle 20 while the wireless device 22 is used. The revenue sharing rates are modified to provide incentives for a driver to use the wireless device 22 in a hands-free operation at lower speeds and in rural areas. Incentives associated with the weather may also be provided wherein if the driver receives better rates by using the wireless device in good weather during the day, rather than during bad weather and/or at night. The parameters for providing these incentives may be changed and modified and all such combinations are contemplated as within the scope of the present invention.

The cost savings to the end user according to this aspect of the invention are be communicated to the driver on the billing statement. The computer server 94 will then coordinate and receive weather information from a weather computer server(not shown) and location, time of day, and speed data and calculate the billing amount according to the various conditions under which the driver is using the integrated wireless device 22.

In addition to incentives for an end user, restrictions may be provided. For example, the system may provide a warning or restrict the use of the wireless device 22 under certain circumstances. For example, a warning may be provided when data indicates attachment (integration) of the wireless device and the driver is speeding in a congested down-town area. Weather conditions may be communicated to the computer server and factored into the warning. Again, various combinations of parameters may be used to provide warnings or restrictions on use of the wireless device 22 in the vehicle 20.

Although the above description is specific, the examples given should not be construed as limiting the scope of the invention but as merely providing illustrations of some of the preferred embodiments of the invention. For example, although the terms vehicle and automobile are used, any device which transports people may be used such as motorcycles, trains or planes. Thus, the scope of the invention should be determined by the appended claims and their legal equivalents, rather than by any examples given.

We claim:

1. A system for monitoring communication time for a wireless device while the wireless device is integrated with a vehicle, the system comprising:
   a wireless network that communicates with the wireless device and receives vehicle identification information; and
   a computer server communicating with the wireless network that monitors a period of time associated with the wireless device while the wireless device is integrated with the vehicle to determine a revenue split between a wireless service provider and at least another party associated with providing hands-free wireless capability.

2. The system of claim 1, further comprising:
   a vehicle wireless device mounting unit that receives the wireless device and communicates the vehicle identification information to the wireless device.

3. The system of claim 2, wherein the period of time is associated with whether the wireless device is communicating with the wireless network while in the vehicle wireless device mounting unit.

4. The system of claim 3, wherein the computer server calculates a percentage of revenue for the period of time the wireless device is integrated with the vehicle wireless device mounting unit.

5. The system of claim 4, wherein the percentage of revenue is associated with a vehicle service provider of the vehicle.

6. The system of claim 2, further comprising:
   an electronic control unit that communicates the vehicle velocity to the wireless device through the vehicle wireless device mounting unit.

7. The system of claim 6, further comprising:
   a positioning system communicating with the wireless device to transmit a vehicle location.

8. The system of claim 7, wherein the computer server calculates a percentage of revenue for the time the wireless device is integrated with the vehicle wireless device mounting unit, the percentage of revenue being associated with the vehicle velocity and location.

9. The system of claim 8, wherein the percentage of revenue is shared with a wireless service provider and a vehicle service provider.

10. The system of claim 8, wherein the percentage of revenue calculated provides incentives to a driver of the vehicle according to vehicle velocity and location.

11. The system of claim 10, wherein the percentage of revenue is further calculated according to whether the vehicle ignition is on.

12. A system for monitoring communication time for a wireless device mounted in a vehicle, the system comprising:
   a wireless device mounting unit within the vehicle; and
   a wireless device that receives a vehicle identification when integrated with the wireless device mounting unit, wherein the vehicle identification is used to monitor a period of time associated with the wireless device while it is integral with the wireless device mounting unit to determine a revenue split between a wireless service provider and at least another party associated with providing hands-free wireless capability.

13. The system of claim 12, further comprising:
a wireless network that communicates with the wireless device and receives the vehicle identification from the integrated wireless device; and
a server communicating with the wireless network that monitors a period of time associated with the wireless device while integrated with the wireless device mounting unit.

14. The system of claim 13, wherein the server further calculates a percentage of revenue for wireless communication via the wireless device while the wireless device is integral with the wireless device mounting unit.

15. The system of claim 14, wherein the wireless device mounting unit is manufactured and installed with the vehicle.

16. The system of claim 15, wherein the mounted wireless device is prevented from being used until the wireless network verifies and acknowledges the vehicle identification.

17. The system of claim 16, wherein the wireless network prevents use of the integral wireless device until the wireless network acknowledges the vehicle identification.

18. The system of claim 16, wherein the vehicle prevents use of the integral wireless device until the wireless network acknowledges the vehicle identification.

19. The system of claim 16, wherein the percentage of revenue calculated is paid to a manufacturer of the vehicle.

20. A wireless device for communicating data to a wireless network while the wireless device is integrated with a vehicle, the wireless device comprising:
a processor operating software that receives a vehicle identification from the vehicle, the processor receiving a signal indicating whether the wireless device is integrated with the vehicle; and
a transmission unit that communicates with the processor and transmits the vehicle identification to the wireless network, the wireless network monitoring the amount of time that communication occurs while the wireless device is integrated with the vehicle to determine a revenue split between a wireless service provider and at least another party associated with providing hands-free wireless capability.

21. The wireless device of claim 20, wherein the vehicle identification is received from the vehicle via data pins.

22. The wireless device of claim 21, wherein the vehicle identification is received from the vehicle via wireless means.

23. A system that monitors a period of time associated with a wireless device while the wireless device is integrated with a vehicle, the system comprising:
a vehicle wireless device mounting unit that receives and attaches the wireless device to the vehicle;
an electronic control unit communicating with the vehicle wireless device mounting unit for transmitting at least a vehicle identification number to the wireless device; and
a transceiver communicating with the electronic control unit and with a wireless network, the transceiver communicating information to the wireless network associated with whether the wireless device is integrated with the vehicle to determine a revenue split between a wireless service provider and at least another party associated with providing hands-free wireless capability.

24. The system of claim 23, wherein the transceiver communicates a vehicle identification number to the wireless network.

25. The system of claim 24, wherein the transceiver communicates with a billing center to calculate revenue associated with whether the wireless device is mounted in the vehicle wireless device mounting unit.

26. A method for monitoring a period of time associated with using a wireless device when the wireless device is integrated with a vehicle, the method comprising:
obtaining a vehicle identification for the vehicle via the wireless device;
transmitting the vehicle identification to a wireless network; and
monitoring by a computer server a period of time associated with the wireless device while the wireless device is integrated with the vehicle to determine a revenue split between a wireless service provider and at least another party associated with providing hands-free wireless capability.

27. The method of claim 26, wherein monitoring the period of time associated with the wireless device while the wireless device is integrated with the vehicle further comprises recording the amount of time the wireless device communicates with the wireless network.

28. The method of claim 26, wherein monitoring the period of time associated with the wireless device while the wireless device is integrated with the vehicle further comprises recording the amount of time the wireless device is integrated with the vehicle.

29. The method according to one of claims 27, further comprising:
transmitting an attachment signal to the wireless network when the wireless device becomes integral with the vehicle.

30. The method according to claim 29, further comprising:
transmitting a detachment signal to the wireless network when the wireless device is no longer integrated with the vehicle.

31. A method for monitoring the communication time for a wireless device when the wireless device is integrated with a wireless device mounting unit within a vehicle, the method comprising:
obtaining a vehicle identification for the vehicle via the wireless device;
transmitting the vehicle identification to a wireless network;
sending an attachment signal to the wireless network at the beginning of a data communication session from the integrated wireless device;
sending a detachment signal at the end of the data communication session from the integrated wireless device; and
monitoring by a computer server of a period of time associated with data communication while the wireless device is integrated with the vehicle, and associated with the attachment and detachment signals.

32. The method according to claim 31, further comprising:
calculating a percentage of revenue received for the data communication while the wireless device is integrated with the vehicle.

33. The method according to claim 32, wherein obtaining a vehicle identification for the vehicle further comprises the vehicle communicating the vehicle identification to the integrated wireless device.

34. The method according to claim 33, further comprising:

preventing the use of the wireless device until acknowledgement of the vehicle identification.

35. The method according to claim 34, wherein the vehicle prevents the use of the wireless device until acknowledgement of the vehicle identification.

36. The method according to claim 34, wherein the network prevents the use of the wireless device until acknowledgement of the vehicle identification.

37. The method according to claim 36, wherein transmitting the vehicle identification to a wireless network further comprises:

after transmitting the vehicle identification to the network, waiting for an acknowledgement;

transmitting an acknowledgement of the vehicle identification to the wireless device; and transmitting the vehicle identification acknowledgement from the wireless device to the vehicle.

38. The method according to claim 37, further comprising:

enabling the use of the wireless device after the vehicle receives the vehicle identification acknowledgement.

39. A method of sharing revenue for services provided in a wireless communication network when a wireless device is integrated with a vehicle using a mounting platform, the method comprising:

obtaining a vehicle identification;

transmitting the vehicle identification to the wireless communication network; and sharing revenue generated by the use of the wireless device between a wireless service provider and a manufacturer of the mounting platform.

40. The method of claim 39, wherein sharing revenue further comprises:

calculating a percentage of revenue associated with the use of the wireless device when the wireless device is integrated with the vehicle; and paying the percentage of revenue to a service provider of the mounting platform.

41. The method of claim 40, wherein calculating a percentage of revenue further comprises calculating the percentage of revenue associated with the use of the wireless device while integrated with the vehicle and the location of the vehicle.

42. The method of claim 41, wherein calculating a percentage of revenue further comprises calculating the percentage of revenue in connection with the speed of the vehicle while the wireless device is used.

43. The method of claim 42, wherein calculating a percentage of revenue further comprises calculating the percentage of revenue in connection with the weather conditions during use of the integrated wireless device.

44. A method of providing incentives to a user of a wireless device in a vehicle when the wireless device is integrated with a vehicle using a mounting platform, the method comprising:

obtaining a vehicle identification via the mounting platform;

transmitting the vehicle identification to the wireless communication network; and calculating an amount of revenue sharing for the use of the integrated wireless device to provide financial incentives to the user regarding use of the wireless device in the vehicle.

45. The method of providing incentives to a user of a wireless device of claim 44, wherein calculating an amount of reduced billing is further associated with a speed of the vehicle while using the integrated wireless device.

46. The method of providing incentives to a user of a wireless device of claim 44, wherein calculating an amount of reduced billing is further associated with a location of the vehicle while using the integrated wireless device.

47. The method of providing incentives to a user of a wireless device of claim 46, wherein calculating an amount of reduced billing is further associated with weather conditions In the location of the vehicle while the user is using the integrated wireless device.

* * * * *